(12) United States Patent
Mazzer

(10) Patent No.: US 8,226,020 B2
(45) Date of Patent: Jul. 24, 2012

(54) SAFETY ACCESSORY FOR COFFEE GRINDERS-DISPENSERS

(75) Inventor: Giovanni Mazzer, Gardigiano di Scorze' (IT)

(73) Assignee: Mazzer Luigi S.r.l., Gardigiano di Scorze' (IT)

( * ) Notice: Subject to any disclaimer, the term of this patent is extended or adjusted under 35 U.S.C. 154(b) by 98 days.

(21) Appl. No.: 12/630,173

(22) Filed: Dec. 3, 2009

(65) Prior Publication Data

US 2010/0155515 A1  Jun. 24, 2010

(30) Foreign Application Priority Data

Dec. 23, 2008  (IT) .............................. VE20080029 U

(51) Int. Cl.
*B02C 19/00* (2006.01)

(52) U.S. Cl. ...................................... 241/37.5; 241/100

(58) Field of Classification Search ................. 241/37.5, 241/100
See application file for complete search history.

(56) References Cited

U.S. PATENT DOCUMENTS

| 1,696,636 A | * | 12/1928 | Johnston | 241/33 |
| 2,779,369 A | * | 1/1957 | Biro | 241/37.5 |
| 3,109,472 A | * | 11/1963 | Lasar | 241/37.5 |

* cited by examiner

*Primary Examiner* — Mark Rosenbaum
(74) *Attorney, Agent, or Firm* — Themis Law

(57) ABSTRACT

A safety accessory for coffee grinders-dispensers includes a substantially cylindrical sleeve having a lower annular portion insertable into the base of a grinder-dispenser, an upper annular portion engagable with the neck of a container that contains coffee beans, and an intermediate annular portion provided internally with at least one interceptor member that allows the coffee beans to move into the grinding chamber but also prevents the insertion into the grinding chamber of an element in accordance with grinder-dispenser safety regulations.

5 Claims, 3 Drawing Sheets

SAFETY ACCESSORY FOR COFFEE GRINDERS-DISPENSERS

FIELD OF THE INVENTION

The present invention relates to a safety accessory for coffee grinders-dispensers.

BACKGROUND OF THE INVENTION

Coffee grinders-dispensers are known, which include a base enclosing an electric motor operating a grinding device housed in a grinding chamber that communicates upwardly, via a vertical conduit, with a bell-shaped vessel containing coffee beans and laterally with a conduit leading to a metering dispenser.

In the lower part, at the coffee passage aperture, the bell-shaped vessel includes a protection element in the form of an inverted basket, the lateral walls of which comprise passage apertures for the granular coffee.

This basket is shaped to prevent the fingers of a careless user from being inserted into the grinding chamber during use of the grinder-dispenser.

In particular, this shape must be such to prevent access by a standard hand-shaped element having an articulated finger.

On the other hand, such grinders-dispensers are not safe if used with barrel-shaped metal containers screwed into a corresponding threaded portion provided in a collar inserted into the vertical conduit.

In this respect, the effect of removing such a container from the grinder-dispenser is to provide free access to the grinding chamber, causing the aforedescribed danger.

SUMMARY OF THE INVENTION

An object of the invention is to eliminate this drawback by providing a safety accessory which can be applied to the grinder-dispenser to ensure a high degree of safety even when the metal container is not applied to the grinder-dispenser.

This and other objects, which will be apparent from the following description, are achieved with a safety accessory for coffee grinders-dispensers according to the invention that includes a substantially cylindrical sleeve having:

a lower annular portion insertable into the grinder-dispenser base, an upper annular portion engagable to the neck of a container containing the coffee beans, and an intermediate annular portion provided internally with at least one interceptor member allowing coffee beans to move into the grinding chamber but also preventing the insertion into said chamber of an element formed in accordance with grinder-dispenser safety regulations.

BRIEF DESCRIPTION OF THE FIGURES OF THE DRAWINGS

The present invention is further described hereinafter with reference to the accompanying drawings, in which.

DETAILED DESCRIPTION OF EMBODIMENTS OF THE INVENTION

Figure 1:
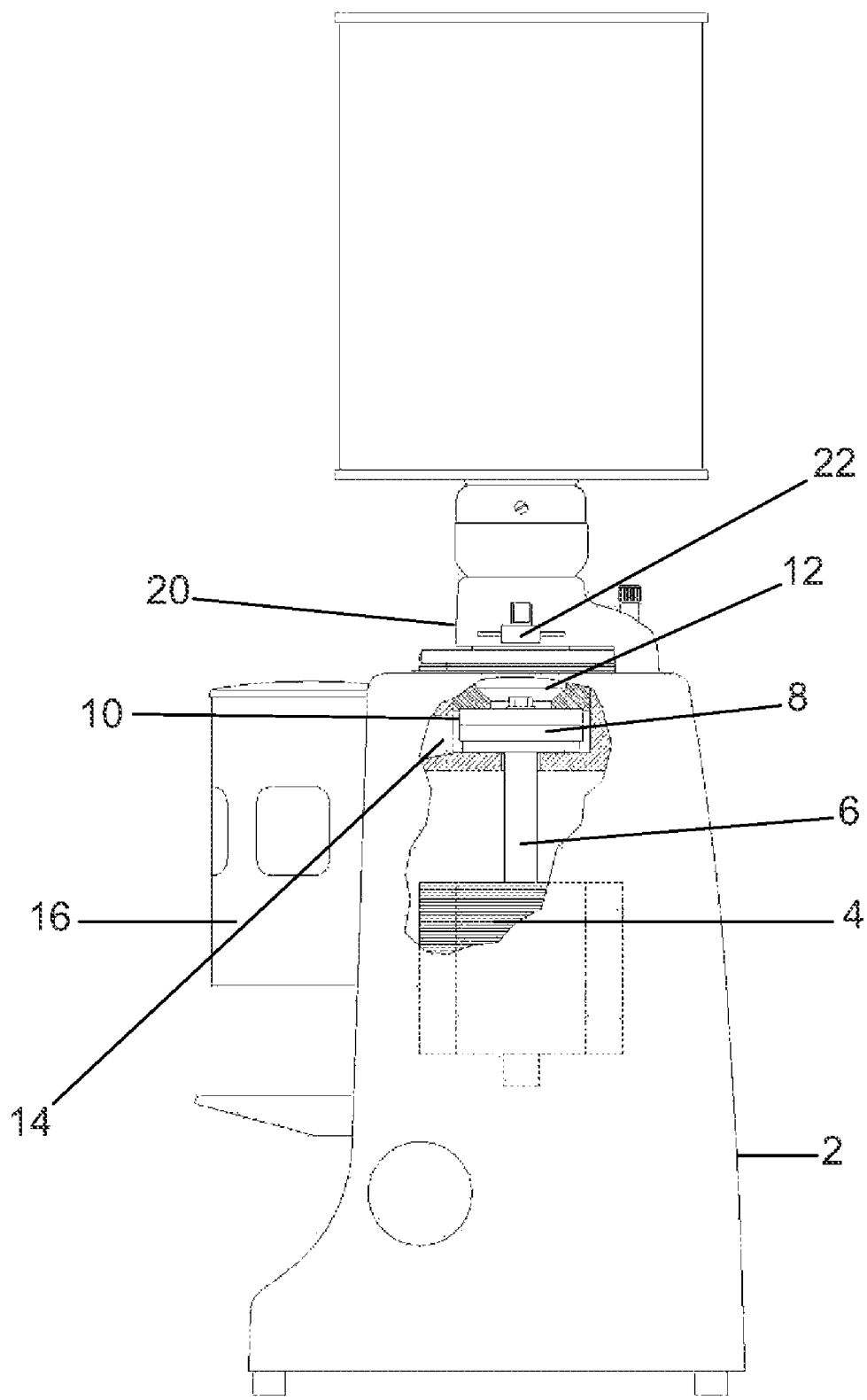
FIG. 1 is a side view of a grinder-dispenser according to the invention showing a detail therein.
Figure 2:
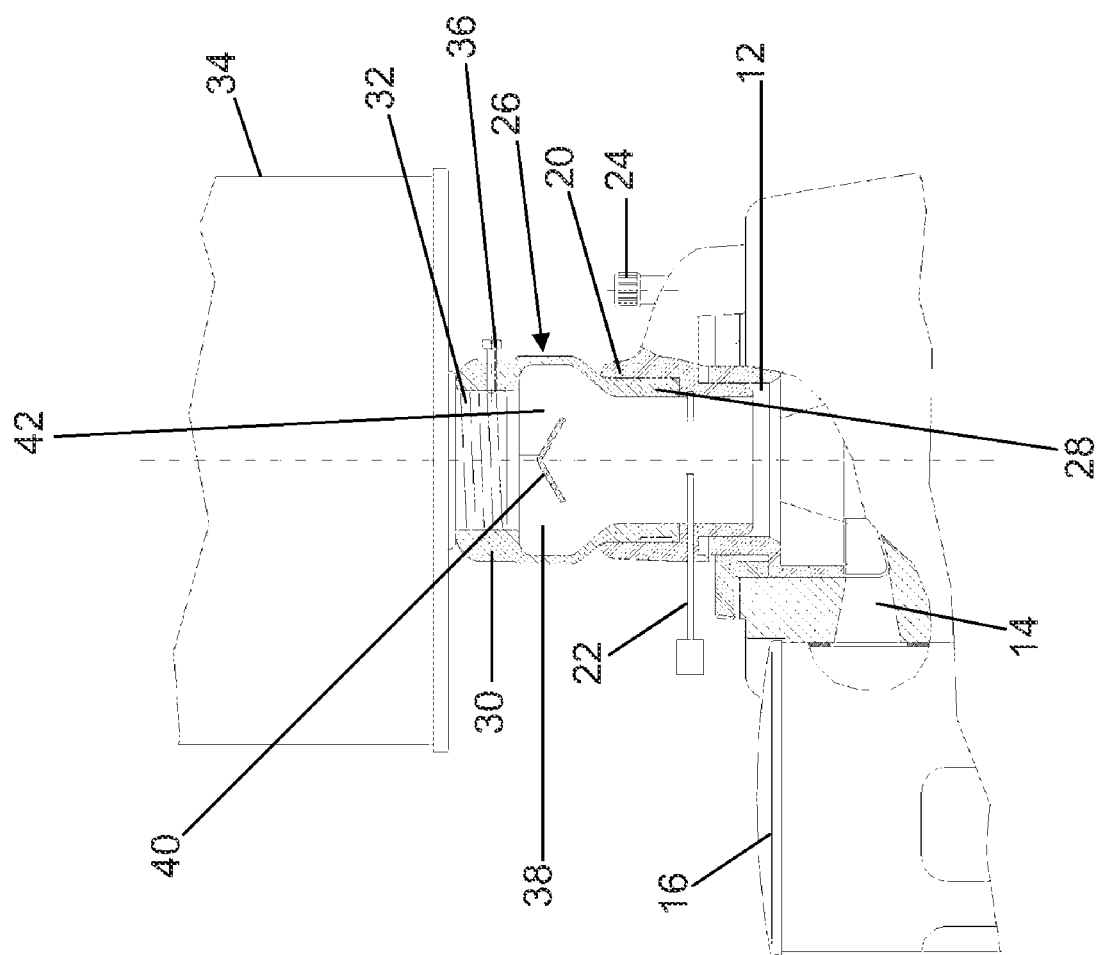
FIG. 2 is a partial longitudinal section view therethrough.

As shown in the figures, a safety accessory according to the invention is applied to a traditional coffee grinder-dispenser that includes a base 2 housing an electric motor 4, the shaft 6 of which operates grinding wheels 8 housed in a grinding chamber 10.

The chamber is provided upwardly with a vertical conduit 12 and laterally with a horizontal conduit 14 leading to a dispenser 16 containing the powdered coffee.

A sleeve 20 provided with an interceptor gate 22 is applied to the base at the exit end of the vertical conduit. The sleeve 20 is provided with a fixing screw 24, and activates the circuit of the motor 4 when applied to the base while deactivating it when removed from the base, to hence ensure the safety of the grinder-dispenser.

The accessory 26 according to the invention, which includes a metal or plastic or transparent plastic cylindrical body, is inserted into the sleeve 20.

In particular, the accessory 26 comprises:

a lower annular portion 28 inserted into the sleeve 20;

an upper annular portion 30 engagable by the threaded neck 32 of a metal or plastic container 34 containing the coffee beans. A screw 36 securely affixes the accessory 26 to the neck 32; and an intermediate annular portion 38 having an inner diameter greater than the other two portions, into which an interceptor member 40 is inserted, and which is configured to provide channels 42 shaped to allow coffee beans to pass but also to prevent the fingers of a user's hand from entering into the grinding chamber when the container is removed. In particular, this member 40 is shaped to prevent the insertion of an articulated finger in accordance with current grinder-dispenser safety regulations. The interceptor member 40 can be provided with a magnet, the purpose of which is to retain any magnetic bodies.

Figure 3:
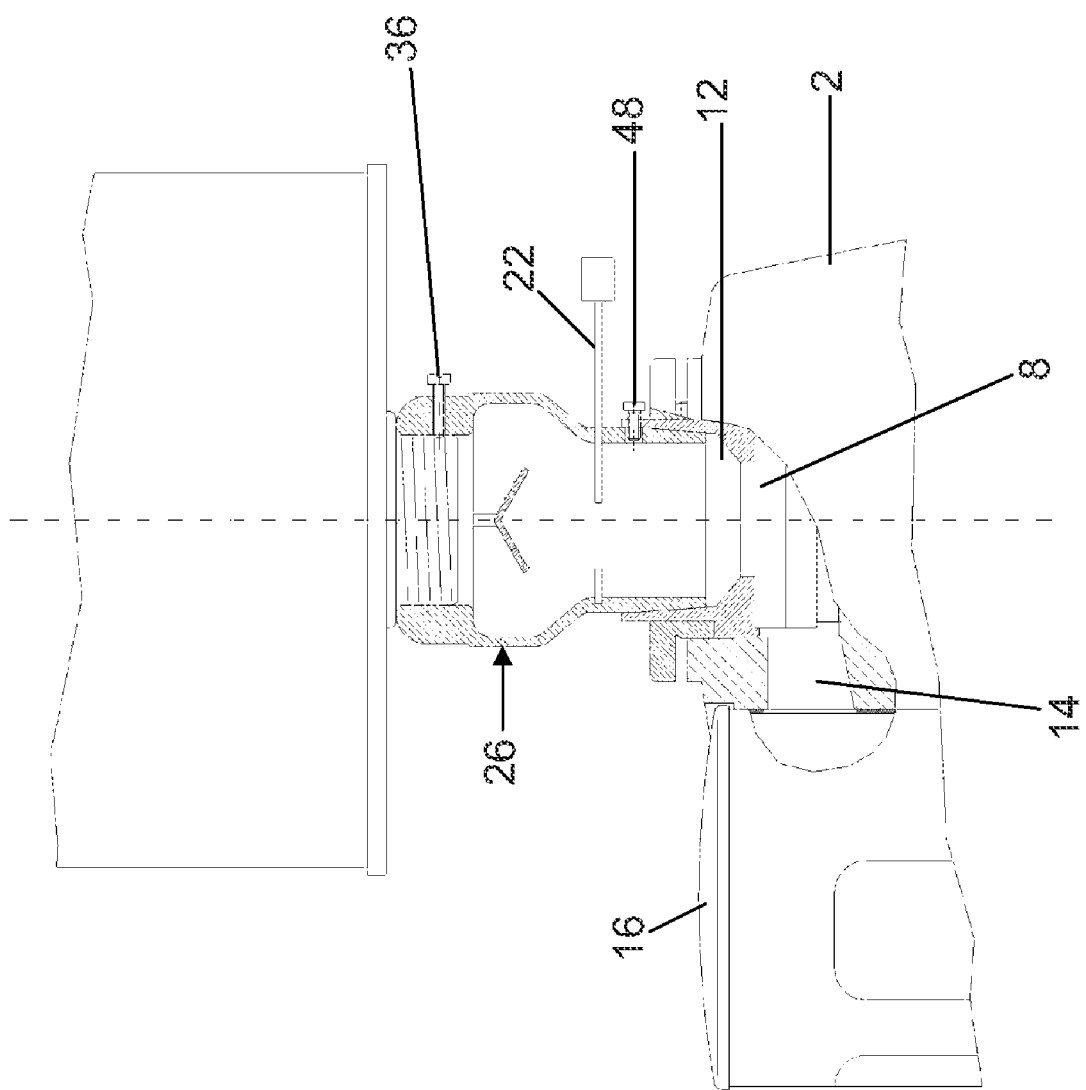
FIG. 3 is a partial longitudinal section view of an alternative embodiment thereof.

In the embodiment shown in FIG. 3, the gate 22 is directly applied to the accessory 26 and is affixed to the base 2 with a screw 48.

What is claimed is:

1. A safety accessory for coffee grinders-dispensers comprising:
a tubular body configured to be disposed between a neck of a container containing coffee beans and a sleeve extending from a coffee grinder-dispenser, the tubular body comprising:
a lower annular portion insertable into the sleeve;
an upper annular portion engageable with the neck of the container containing the coffee beans; and
an intermediate annular portion provided internally and having at least one interceptor member allowing the coffee beans to move into a grinding chamber of the grinder-dispenser while preventing insertion into said chamber of an element configured in accordance with grinder-dispenser safety regulations.

2. The accessory of claim 1, wherein the neck of the container is threaded, and wherein the upper annular portion is internally threaded for engagement with the threaded neck of the container.

3. The accessory of claim 1, wherein the upper portion comprises a setscrew configured to engage a collar of the container.

4. The accessory of claim 1, further comprising a magnet associated with the interceptor member.

5. The accessory of claim 1, wherein the intermediate annular portion has an inner diameter larger than inner diameters of the lower and upper annular portions.

* * * * *